US005944319A

United States Patent [19]

Kohlman

[11] Patent Number: 5,944,319

[45] Date of Patent: Aug. 31, 1999

[54] METHOD OF FORMING A METAL TO METAL SEAL BETWEEN TWO CONFRONTING FACES OF PRESSURE CONTAINING BODIES AND A METAL TO METAL SEAL

[75] Inventor: Nicholas Kohlman, Edmonton, Canada

[73] Assignee: Vanoil Equipment Inc., Leduc, Canada

[21] Appl. No.: 08/915,720

[22] Filed: Aug. 21, 1997

[51] Int. Cl.[6] .............................. E21B 17/08; F16L 23/16

[52] U.S. Cl. .......................... 277/314; 277/603; 277/607; 277/626; 277/627; 285/334.2; 285/370

[58] Field of Search .................................... 285/370, 368, 285/334.2; 277/603, 607, 609, 627, 614, 626, 314

[56] References Cited

U.S. PATENT DOCUMENTS

| | | | |
|---|---|---|---|
| 163,588 | 5/1875 | Goodall | 285/370 X |
| 951,704 | 3/1910 | Schmidt | 285/370 X |
| 969,422 | 9/1910 | Tanner et al. | 285/370 X |
| 1,426,724 | 8/1922 | Fyffe | 285/370 X |
| 1,821,863 | 11/1931 | Wilson | 285/334.2 |
| 2,168,631 | 8/1939 | Scott | 285/370 X |
| 2,900,199 | 8/1959 | Logan | 277/614 |
| 4,441,725 | 4/1984 | Bailey | 277/167 |
| 4,458,925 | 7/1984 | Raulins et al. | 285/332.2 |
| 4,521,040 | 6/1985 | Slyker et al. | 285/140 |
| 4,550,936 | 11/1985 | Haeber et al. | 285/370 X |
| 4,573,714 | 3/1986 | Sweeney | 285/370 X |
| 5,480,196 | 1/1996 | Adams | 285/370 X |

*Primary Examiner*—Anthony Knight
*Attorney, Agent, or Firm*—Davis and Bujold

[57] ABSTRACT

A metal to metal seal and a method of forming the same includes providing a pair of opposed clamping faces. Each of the clamping faces surround apertures. Seal grooves serve to widen each of the apertures. Each of the seal grooves have truncated angular corners. A malleable metal sealing ring is positioned in the seal grooves. The sealing ring has truncated angular outer edges complementary to the truncated angular corners in the seal grooves. The clamping faces are clamped together in face to face relation to energize the sealing ring. The sealing ring has an enlarged inner diameter to create an deflectable edge at the truncated annular edges. The subsequent application of internal pressure serves to promote deflection of the metal sealing ring at the truncated angular edges and further energize the sealing ring.

4 Claims, 2 Drawing Sheets

42
38
38
42
40
2
44
18
28
46
22
48
50
22
46
12
14
40
42
36
38
26
16
38
36
42
10

METHOD OF FORMING A METAL TO METAL SEAL BETWEEN TWO CONFRONTING FACES OF PRESSURE CONTAINING BODIES AND A METAL TO METAL SEAL

FIELD OF THE INVENTION

The present invention relates to a method of forming a metal to metal seal between two confronting faces of pressure containing bodies and a metal to metal seal intended for use in sealing between two confronting faces of pressure containing bodies.

BACKGROUND OF THE INVENTION

Most metal to metal seals used between two confronting faces of pressure containing bodies, such as a flanged pipe joint, rely entirely for their effectiveness upon the clamping force of the flanged connection. Should internal pressure within the pressure containing bodies at any time exceed this clamping force, the metal to metal seal will leak.

SUMMARY OF THE INVENTION

What is required is a metal to metal seal for use between two confronting faces of pressure containing bodies that will be energized as internal pressure increases.

According to one aspect of the present invention there is provided a method of forming a metal to metal seal between two confronting faces of pressure containing bodies. A first step involves providing a first pressure containing body having a first clamping face surrounding a first aperture. A second step involves providing a second pressure containing body having a second clamping face surrounding a second aperture. A third step involves machining a first interior seal groove in the first pressure containing body which serves to widen the first aperture. The first seal groove has truncated angular corners spaced from the first clamping face. A fourth step involves machining a second seal groove in the second pressure containing body serving to widen the second aperture. The second seal groove has truncated angular corners spaced from the second clamping face. A fifth step involves a malleable metal sealing ring with truncated angular outer edges complementary to the truncated angular corners in the first seal groove and the second seal groove. The sealing ring is dimensioned so that the truncated angular outer edges engage the truncated angular corners prior to the first clamping face and the second clamping face engaging. A sixth step involves clamping the first clamping face and the second clamping face together in face to face relation to energize the seal. The subsequent application of internal pressure serves to promote deflection of the metal sealing ring at the truncated angular corners such that an increase in internal pressure serves to further energize the seal.

According to another aspect of the invention there is provided a metal to metal seal for use between two confronting faces of pressure containing bodies including a first pressure containing body, a second pressure containing body and a malleable metal sealing ring. The first pressure containing body has a first clamping face surrounding a first aperture and a first interior seal groove serving to widen the first aperture. The first seal groove has truncated angular corners spaced from the first clamping face. The second pressure containing body has a second clamping face surrounding a second aperture. A second seal groove serves to widen the second aperture. The second seal groove has truncated angular corners spaced from the second clamping face. Means is provided for clamping the first clamping face and the second clamping face together in face to face relation. A malleable metal sealing ring is provided having truncated angular outer edges complementary to the truncated angular corners. The sealing ring is dimensioned so that the truncated angular outer edges engage the truncated angular corners prior to the first clamping face and the second clamping face engaging.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
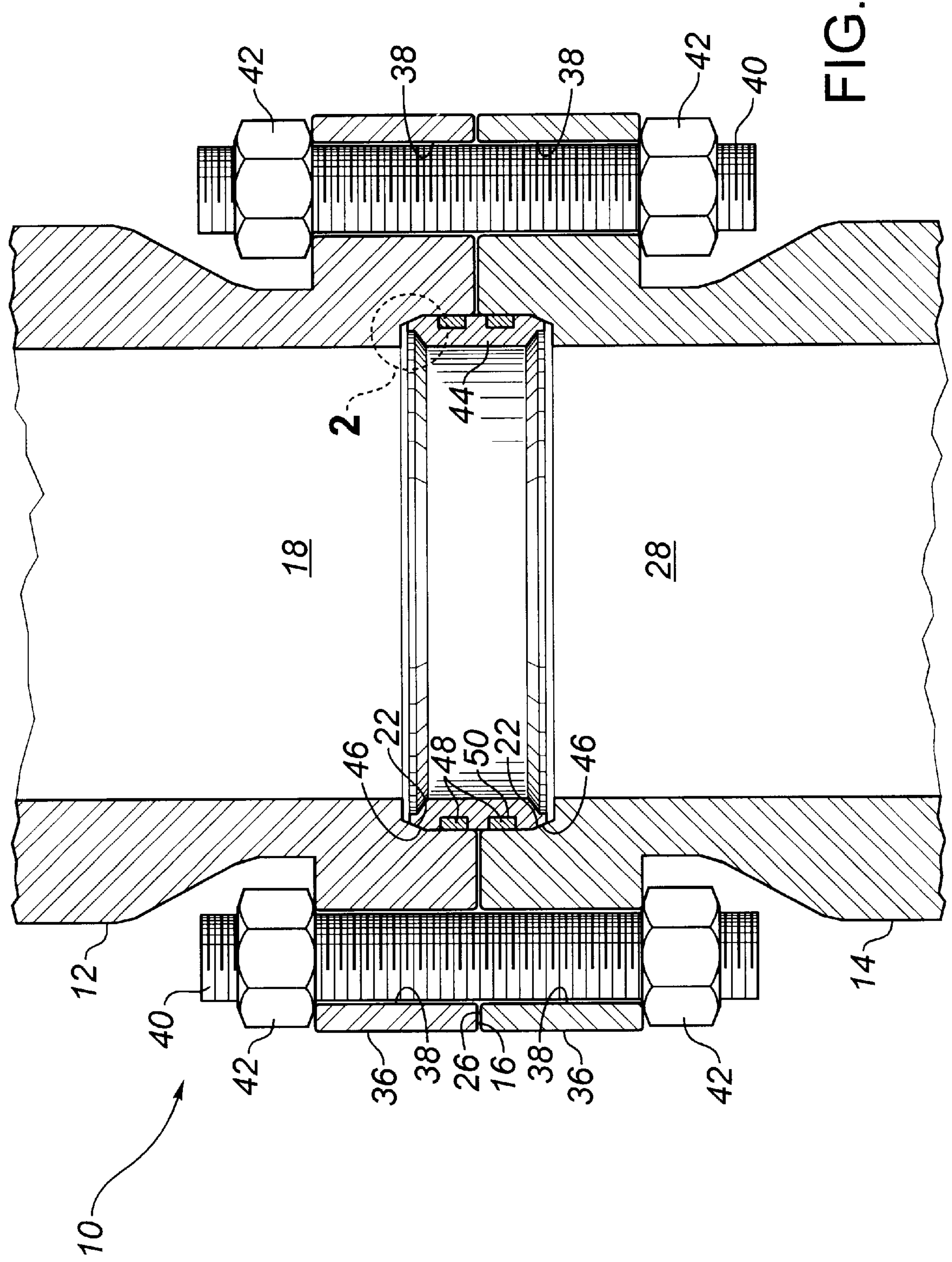
FIG. 1 is a side elevation view, in section, of a flanged connection sealed by a metal to metal seal in accordance with the teachings of the present invention.
Figure 2:
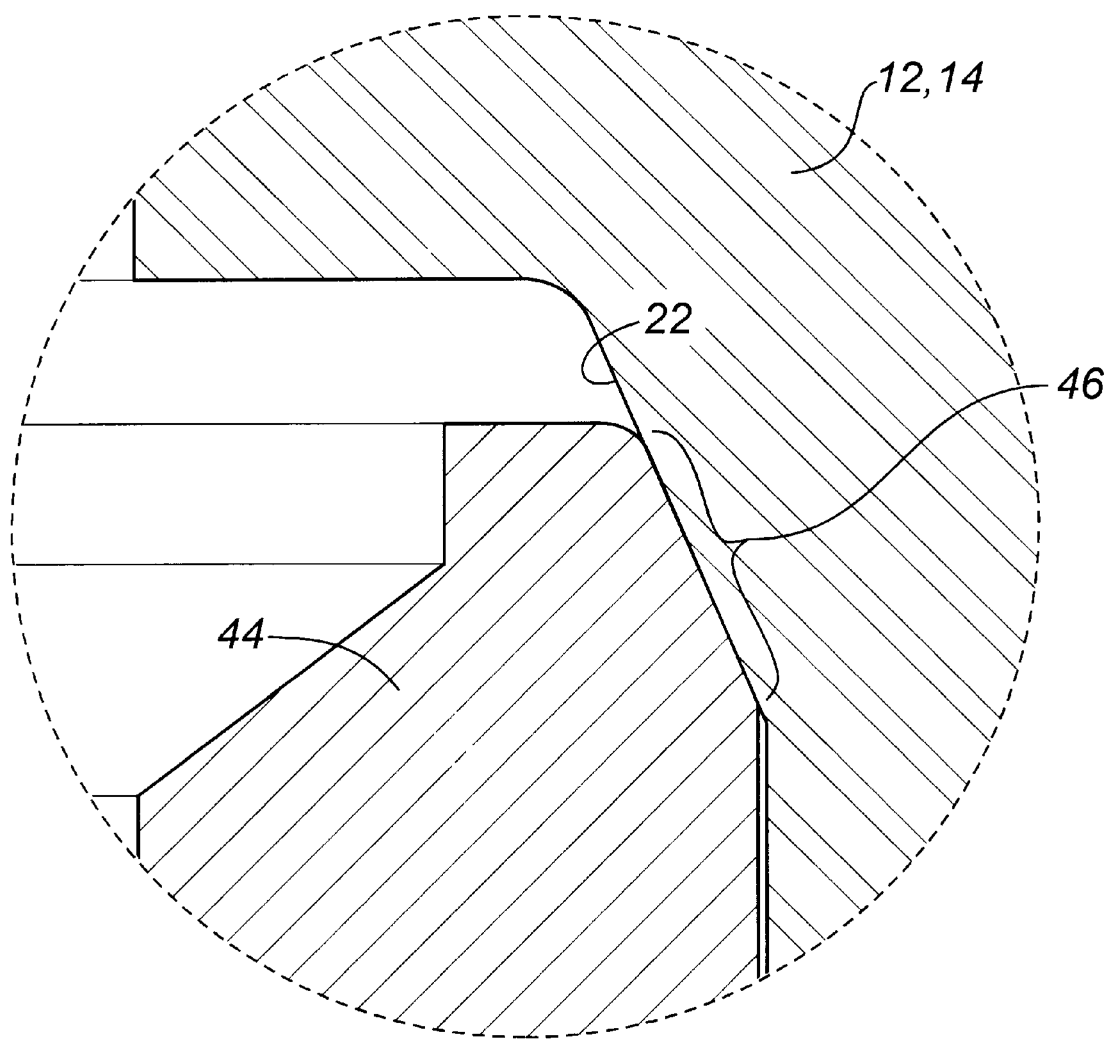
FIG. 2 is a magnified side elevation view, in section, of a portion of the metal to metal seal illustrated in FIG. 1.

The preferred embodiment, a metal to metal seal generally identified by reference numeral 10, will now be described with reference to FIGS. 1 and 2.

Metal to metal seal 10 is intended for use between two confronting clamping faces of pressure containing bodies, as will hereinafter be further described. Referring to FIG. 1, there is provided a first tubular pressure containing body 12 and a second tubular pressure containing body 14. Although the bodies illustrated are tubular, they need not be. First pressure containing body 12 has a first clamping face 16 surrounding a first aperture 18. A first interior seal groove 20 serves to widen first aperture 18. First seal groove 20 has truncated angular corners 22 spaced from first clamping face 16. The second pressure containing body 14 has a second clamping face 26 surrounding a second aperture 28. A second seal groove 30 serves to widen second aperture 28. Second seal groove 30 also has truncated angular corners 22, with such truncated angular corners being spaced from second clamping face 26. Both first pressure containing body 12 and second pressure containing body 14 have flanges 36 with apertures 38 in which are received threaded fasteners 40 with associated lock nuts 42, which serve as means for clamping first clamping face 16 and second clamping face 26 together in face to face relation. A malleable metal sealing ring 44 is provided having truncated angular outer edges 46. Truncated angular outer edges 46 are complementary to truncated angular corners 22, previously described. Sealing ring 44 has a middle portion having a substantially constant inner diameter and outer diameter, the inner diameter being gradually enlarged proximate the truncated angular outer edges 46 so that truncated angular outer edges 46 engage truncated angular corners 22, prior to first clamping face 16 and second clamping face 26 engaging. Referring to FIG. 2, the engagement between truncated angular outer edges 46 and truncated angular corners 22 is illustrated. Referring to FIG. 1, sealing ring 44 has circumferential "O" ring seals 48 positioned in circumferential seal grooves 50.

The use and operation of metal to metal seal 10 in accordance with the teachings of the preferred method will now be described. A first step involves providing first pressure containing body 12, as described. A second step involves providing second pressure containing body 14, as described. A third step involves machining first interior seal groove 20 in first pressure containing body 12, as described.

A fourth step involves machining a second seal groove 30 in second pressure containing body 14, as described. A fifth step involves inserting malleable metal sealing ring 44 in first seal groove 20 and second seal groove 30. A sixth step involves clamping first clamping face 16 and second clamping face 26 together in face to face relation to energize metal to metal seal 10. Sealing ring 44 is dimensioned so that each of truncated angular outer edges 46 become sealingly engaged along the surface provided by truncated angular corners 22 prior to first clamping face 16 and second clamping face 26 engaging. The subsequent application of internal pressure serves to promote deflection of metal sealing ring 44 at truncated angular corners 46 such that an increase in internal pressure only serves to further energize metal to metal seal 10. In the event of a failure of the metal to metal seal occurring in which there is leakage between truncated angular outer edges 46 of sealing ring 44 and truncated angular corners 22 of one of first seal groove 20 and second seal groove 30, circumferential "O" ring seals 48 provide a backup seal.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A metal to metal seal for use between two confronting faces of pressure containing bodies, comprising:

a first clamping face for attachment to a first of said two confronting faces of pressure containing bodies, the first clamping face surrounding a first aperture, a first interior seal groove serving to widen the first aperture, the first seal groove having truncated angular corners spaced from the first clamping face;

a second clamping face for attachment to a second of said two confronting faces of pressure containing bodies, the second clamping face surrounding a second aperture, a second seal groove serving to widen the second aperture, the second seal groove having truncated angular corners spaced from the second clamping face;

means for clamping the first clamping face and the second clamping face together in face to face relation;

a malleable metal sealing ring having truncated angular outer edges complementary to the truncated angular corners, the sealing ring being dimensioned so that the truncated angular outer edges engage the truncated angular corners prior to the first clamping face and the second clamping face engaging, the sealing ring having a middle portion having a substantially constant inner diameter and outer diameter, the sealing ring further having a gradually enlarged inner diameter juxtaposed from said truncated angular outer edges to create an inwardly deflectable edge at the truncated angular edges such that the subsequent application of internal pressure serves to promote deflection of the metal sealing ring at the deflectable edges and further energize the sealing ring.

2. The metal to metal seal as defined in claim 1, wherein the means for clamping includes flanges with apertures in which are received fasteners.

3. The metal to metal seal as defined in claim 1, wherein the metal sealing ring has at least one circumferential ring seal, thereby providing a backup seal in the event of leakage between the truncated angular outer edges of the sealing ring and the truncated angular corners of one of the first seal groove and the second seal groove.

4. A method of forming a metal to metal seal between two confronting faces of pressure containing bodies, comprising the steps of:

firstly, providing a first pressure containing body having a first clamping face surrounding a first aperture;

secondly, providing a second pressure containing body having a second clamping face surrounding a second aperture;

thirdly, machining a first interior seal groove in the first pressure containing body which serves to widen the first aperture, the first seal groove having truncated angular corners spaced from the first clamping face;

fourthly, machining a second seal groove in the second pressure containing body serving to widen the second aperture, the second seal groove having truncated angular corners spaced from the second clamping face;

Fifthly, inserting a malleable metal sealing ring in the first seal groove and the second seal groove, the malleable metal sealing ring having truncated angular outer edges complementary to the truncated angular corners, the sealing ring being dimensioned so that the truncated angular outer edges engage the truncated angular corners prior to the first clamping face and the second clamping face engaging, the sealing ring having a middle portion having a substantially constant inner diameter and outer diameter, the sealing ring further having a gradually enlarged inner diameter juxtaposed from said truncated angular outer edges to create a deflectable edge at the truncated outer angular edges;

sixthly, clamping the first clamping face and the second clamping face together in face to face relation to energize the sealing ring, the subsequent application of internal pressure serving to promote deflection of the metal sealing ring at the deflectable edges such that an increase in internal pressure serves to further energize the sealing ring.

* * * * *